(12) United States Patent
Uemura et al.

(10) Patent No.: US 7,843,494 B2
(45) Date of Patent: Nov. 30, 2010

(54) IMAGE TAKING APPARATUS AND CONTROL METHOD THEREFOR

(75) Inventors: Tatsuyuki Uemura, Tachikawa (JP); Mitsumasa Okubo, Hino (JP); Kaoru Kaneko, Kodaira (JP)

(73) Assignee: Olympus Imaging Corporation, Tokyo (JP)

( * ) Notice: Subject to any disclaimer, the term of this patent is extended or adjusted under 35 U.S.C. 154(b) by 637 days.

(21) Appl. No.: 11/888,766

(22) Filed: Aug. 2, 2007

(65) Prior Publication Data

US 2008/0036882 A1 Feb. 14, 2008

(30) Foreign Application Priority Data

Aug. 11, 2006 (JP) .............................. 2006-220477

(51) Int. Cl.
H04N 5/228 (2006.01)
H04N 9/73 (2006.01)

(52) U.S. Cl. .............. 348/222.1; 348/223.1; 348/224.1; 348/208.4

(58) Field of Classification Search ............. 396/52–55, 396/155, 158; 348/231.6, 208.4, 208.5, 208.99, 348/241, 254, 239, 222.1, 223.1, 231.99, 348/231.3; 382/162, 168, 254, 255, 274
See application file for complete search history.

(56) References Cited

U.S. PATENT DOCUMENTS

| | | | | |
|---|---|---|---|---|
| 6,650,365 B1* | 11/2003 | Sato | ........................ | 348/231.3 |
| 7,181,091 B2* | 2/2007 | Yoda | ........................... | 382/309 |
| 7,536,036 B2* | 5/2009 | Steinberg et al. | ............ | 382/117 |
| 7,586,524 B2* | 9/2009 | Tsue et al. | ................ | 348/231.2 |
| 7,633,523 B2* | 12/2009 | Toyoda et al. | ............ | 348/207.1 |
| 2003/0169352 A1* | 9/2003 | Kitani | ......................... | 348/247 |
| 2004/0002302 A1* | 1/2004 | Takemoto et al. | .......... | 455/3.06 |
| 2004/0101206 A1 | 5/2004 | Morimoto et al. | | |
| 2004/0119874 A1 | 6/2004 | Imai | | |
| 2004/0141069 A1* | 7/2004 | Nakami | ................... | 348/231.6 |

FOREIGN PATENT DOCUMENTS

| | | | |
|---|---|---|---|
| CN | 1460243 A | 12/2003 |
| CN | 1492380 A | 4/2004 |
| CN | 1630302 A | 6/2005 |
| JP | 2004-040379 A | 2/2004 |
| JP | 2005-167697 A | 6/2005 |
| JP | 2005-260481 A | 9/2005 |

OTHER PUBLICATIONS

Chinese Office Action (and English translation thereof) dated Jul. 18, 2008, issued in a counterpart Chinese Application.

* cited by examiner

*Primary Examiner*—Nhan T Tran
*Assistant Examiner*—Don Nguyen
(74) *Attorney, Agent, or Firm*—Holtz, Holtz, Goodman & Chick, PC (57) ABSTRACT

Disclosed is an image taking apparatus that has functions of performing plural types of corrections on a captured image, and can continuously execute the plural types of corrections on the image. The image taking apparatus can be configured in such a way that when image data recorded in a recording medium is read and is subjected to plural types of corrections, for example, the image data once read can be saved in the recording medium after completion of the plural corrections which are continuously executed. The plural types of corrections can be configured in such a way that the combination or the order thereof is determined based on information unique to the image data.

11 Claims, 11 Drawing Sheets

●- PROCESS TO BE PERFORMED ON IMAGE BY ONE-TOUCH CORRECTION WIZARD

700

| | | FLASH ON (WITH RED EYE DETECTED) | FLASH ON (WITH RED EYE UNDETECTED) | FLASH OFF | |
|---|---|---|---|---|---|
| | IMAGE WITH LARGE BLUR | A→B→C→D | A→B→C | A→B | ⎫ |
| | IMAGE WITH MIDDLE BLUR | A→B→C→D | A→B→C | A→B | ⎬ 701 |
| | IMAGE WITH SMALL BLUR | A→B→C→D | A→B→C | A→B | ⎭ |
| | BLUR-LESS IMAGE | B→C→D | B→C | B | } 702 |
| BLUR | BLUR UNCORRECTABLE IMAGE (DETERMINED) | B→C→D | B→C | B | } 703 |
| | BLUR UNCORRECTABLE IMAGE (NO DETERMINATION REQUIRED) | DISPLAY THAT EDITION IS NOT POSSIBLE, AND RETURN TO ONE-FRAME DISPLAY | DISPLAY THAT EDITION IS NOT POSSIBLE, AND RETURN TO ONE-FRAME DISPLAY | DISPLAY THAT EDITION IS NOT POSSIBLE, AND RETURN TO ONE-FRAME DISPLAY | } 704 AUTOMATICALLY- SHOT AND EDITED IMAGE |
| | IMAGES FROM OTHER MODELS (NO BLUR INFORMATION) | DISPLAY THAT EDITION IS NOT POSSIBLE, AND RETURN TO ONE-FRAME DISPLAY | DISPLAY THAT EDITION IS NOT POSSIBLE, AND RETURN TO ONE-FRAME DISPLAY | DISPLAY THAT EDITION IS NOT POSSIBLE, AND RETURN TO ONE-FRAME DISPLAY | } 705 |

A: ELECTRONIC CAMERA-SHAKE CORRECTING PROCESS
B: TONE CORRECTING PROCESS
C: RED EYE DETECTION
D: RED-EYE CORRECTING PROCESS

● – PROCESS TO BE PERFORMED ON IMAGE BY ONE-TOUCH CORRECTION WIZARD

|  |  | FLASH ON (WITH RED EYE DETECTED) | FLASH ON (WITH RED EYE UNDETECTED) | FLASH OFF |
|---|---|---|---|---|
|  | IMAGE WITH LARGE BLUR | A→B→C→D | A→B→C | A→B |
|  | IMAGE WITH MIDDLE BLUR | A→B→C→D | A→B→C | A→B |
|  | IMAGE WITH SMALL BLUR | A→B→C→D | A→B→C | A→B |
|  | BLUR-LESS IMAGE | B→C→D | B→C | B |
| BLUR | BLUR UNCORRECTABLE IMAGE (DETERMINED) | B→C→D | B→C | B |
|  | BLUR UNCORRECTABLE IMAGE (NO DETERMINATION REQUIRED) | DISPLAY THAT EDITION IS NOT POSSIBLE, AND RETURN TO ONE-FRAME DISPLAY | DISPLAY THAT EDITION IS NOT POSSIBLE, AND RETURN TO ONE-FRAME DISPLAY | DISPLAY THAT EDITION IS NOT POSSIBLE, AND RETURN TO ONE-FRAME DISPLAY |
|  | IMAGES FROM OTHER MODELS (NO BLUR INFORMATION) | DISPLAY THAT EDITION IS NOT POSSIBLE, AND RETURN TO ONE-FRAME DISPLAY | DISPLAY THAT EDITION IS NOT POSSIBLE, AND RETURN TO ONE-FRAME DISPLAY | DISPLAY THAT EDITION IS NOT POSSIBLE, AND RETURN TO ONE-FRAME DISPLAY |

700, 701, 702, 703, 704 AUTOMATICALLY-SHOT AND EDITED IMAGE, 705

A: ELECTRONIC CAMERA-SHAKE CORRECTING PROCESS
B: TONE CORRECTING PROCESS
C: RED EYE DETECTION
D: RED-EYE CORRECTING PROCESS

IMAGE TAKING APPARATUS AND CONTROL METHOD THEREFOR

CROSS REFERENCES TO RELATED APPLICATION

This application is based upon and claims the benefit of priority from prior Japanese Patent Application No. 2006-220477, filed on Aug. 11, 2006, the entire contents of which are incorporated herein by reference.

BACKGROUND OF THE INVENTION

1. Field of the Invention

The present invention relates to an image taking apparatus and a control technique therefor, and, more particularly, to an effective technique adaptable to an image taking apparatus or the like, such as a digital camera, having an image display function of playing back and displaying captured images.

2. Description of the Related Art

Recent popularity of digital cameras is remarkable, and general digital cameras are configured to have at the backside a display capable of displaying captured images. There have been proposed digital cameras of this type which can perform a correction process on captured images.

For example, Japanese Patent Application Laid-Open No. 2005-260481 discloses a digital camera that detects a motion vector from a captured image to perform camera shake correction.

Japanese Patent Application Laid-Open No. 2004-40379 discloses a digital camera that separates a captured image to a first area with a size of an integer multiple of the image size, and a second area with a fraction size, and performs gradation (tone) correction of the captured image by determining a preprocessing value for the second area using a preprocessing value corresponding to the first area.

Japanese Patent Application Laid-Open No. 2005-167697 discloses a digital camera that performs red-eye detection from image data of a low resolution for a thumbnail created at the time of capturing an image, and performs red-eye correction on image data to be recorded, based on the detection result.

Each of the related arts performs camera shake correction, tone correction, red-eye correction and so forth on a digital camera individually.

BRIEF SUMMARY OF THE INVENTION

An image taking apparatus of the present invention has functions of performing plural types of corrections on a captured image, and can continuously execute the plural types of corrections on the image. The image taking apparatus can be configured in such a way that when image data recorded in a recording medium is read and is subjected to plural types of corrections, for example, the image data once read can be saved in the recording medium after completion of the plural corrections which are continuously executed. The plural types of corrections can be configured in such a way that the combination and the order thereof are determined based on information unique to the image data.

As an exemplary structure of the present invention, the image taking apparatus of the present invention comprises an imaging part that images a subject; an image recording part that records image data output from the imaging part and/or image data input externally; an image display part that display the image data; an image correction processing part capable of performing plural types of correction processes on the image data read from the image recording part; and a correction control part that determines a combination and an order of the plural types of correction processes based on information instructing correction, and continuously executes the plural types of correction processes on the image data.

The present invention can be understood as an invention of a control method for the image taking apparatus and an invention of a computer readable recording medium recording a control program for the image taking apparatus.

BRIEF DESCRIPTION OF THE SEVERAL VIEWS OF THE DRAWINGS

These and other features, aspects, and advantages of the apparatus and methods of the present invention will become better understood with regard to the following description, appended claims, and accompanying drawings where:

DETAILED DESCRIPTION OF THE PREFERRED EMBODIMENT

A preferred embodiment of the invention is described below with reference to the accompanying drawings.

Figure 1:
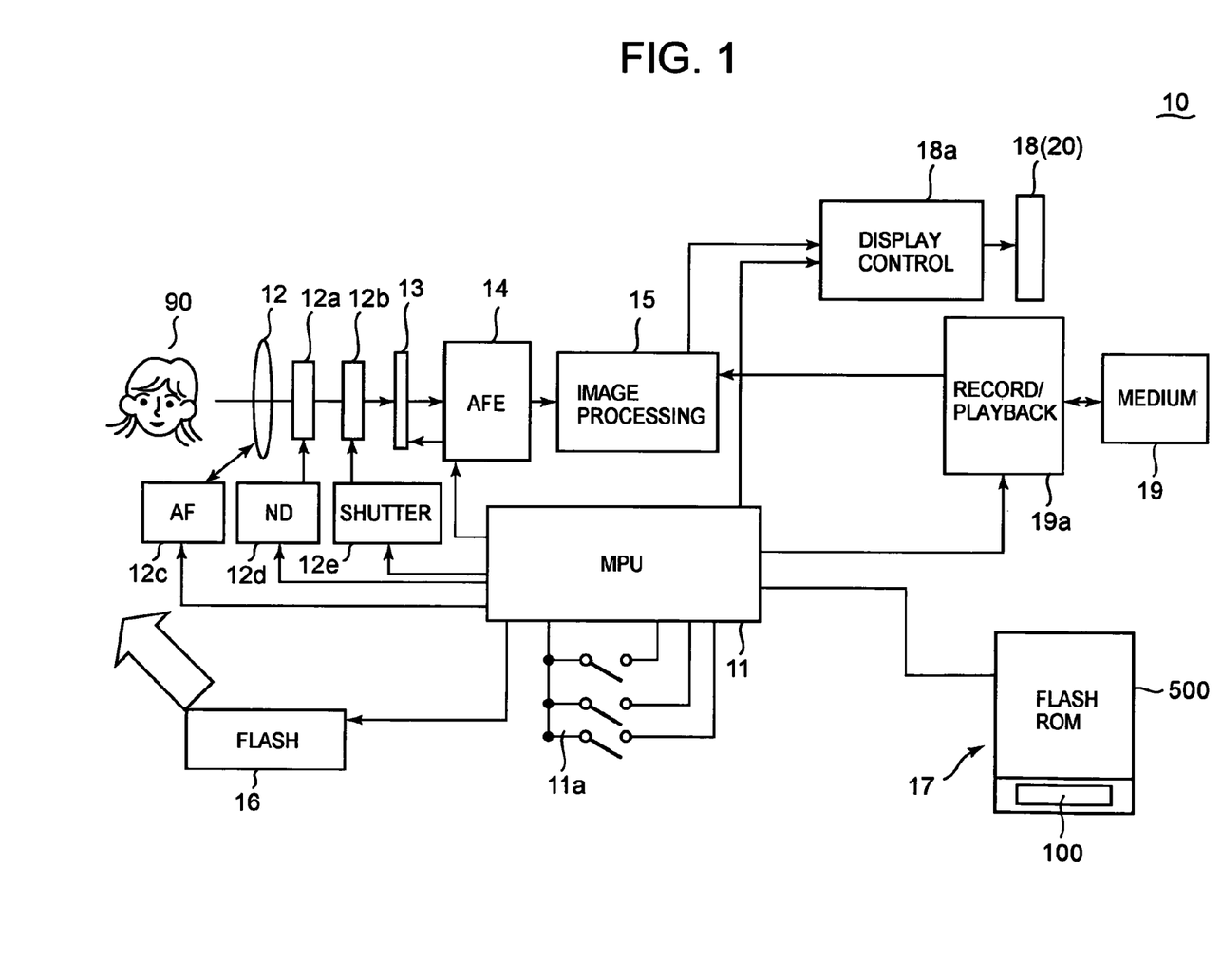
FIG. 1 is a block diagram showing one example of the configuration of an image taking apparatus that executes a control method for an image taking apparatus according to one embodiment of the present invention.
Figure 2:
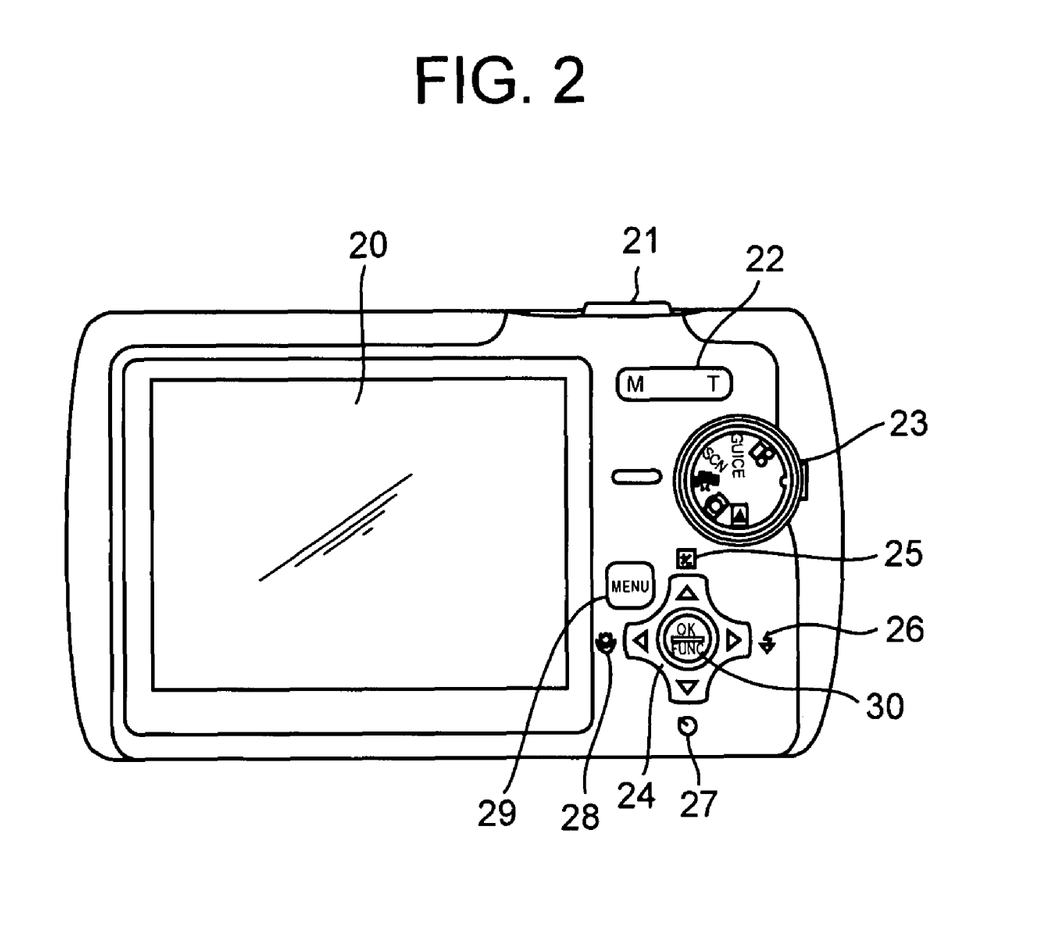
FIG. 2 is a plan view of the image taking apparatus according to the embodiment of the invention as seen from the rear side thereof.

FIG. 1 is a block diagram showing one example of the configuration of an image taking apparatus that executes a control method for an image taking apparatus according to one embodiment of the present invention, and FIG. 2 is a plan view of the image taking apparatus according to the embodiment as seen from the rear side thereof.

As exemplified in FIG. 1, an image taking apparatus 10 of the embodiment includes a lens part 12, an ND (Neutral Density) filter 12a, a shutter 12b, an image pickup device 13, an analog front end part 14 (hereinafter referred to as "AFE part 14"), an image processing part 15, a display part 18 which displays image-s under the control of a display control part 18a, a record/playback control part 19a and a recording medium 19.

The lens part 12 is an optical system which forms an input image of a subject 90 on the image pickup device 13. The shutter 12b selectively shields light passing through the lens part 12 from entering the image pickup device 13, thereby adjusting the amount of exposure.

The image pickup device 13, which comprises, for example, a CMOS image sensor or a CCD image sensor, converts a formed subject image to an image signal. The AFE part 14 converts an analog electric signal output from the image pickup device 13 to image data (main image 102 to be described later) and outputs the image data.

The image processing part 15 performs corrections, such as gamma correction (tone correction), color correction, gradation correction, sharpness correction, camera shake correction and red-eye correction, on the image data output from the AFE part 14. The image processing part 15 has a compression/decompression part for still images, such as the JPEG (Joint Photographic Coding Experts Group) core part (not shown) in the image processing part. The image processing part 15 compresses image data via the compression/decompression part at the time of capturing an image.

The record/playback control part 19a records the image data, compressed by the image processing part 15, in the recording medium 19 at the time of capturing. The recording medium 19 is a recording medium which stores and records images. The record/playback control part 19a reads image data from the recording medium 19 at the time of image playback.

The image taking apparatus 10 is provided with the display control part 18a and the display part 18. The display part 18 constitutes a color panel display 20 to be described later, such as a liquid crystal display or an organic EL (ElectroLuminescence) display. The display part 18 displays a monitor image which is captured (input) via the lens part 12, the image pickup device 13, etc. at the time of capturing, and displays a recorded image decompressed at the time of image playback.

As described above, at the time of capturing, a user determines the composition and timing and performs a shooting operation while viewing the image displayed on the display part 18 (color panel display 20). To ensure near real time display of an image signal from the image pickup device 13, image data restricted to the display size by the AFE part 14 is processed at a high speed by the image processing part 15, and is displayed on the display part 18 via the display control part 18a.

At the time of image playback, compressed data recorded in the recording medium 19 is read by the record/playback control part 19a, played back by the image processing part 15, and displayed on the display part 18.

The image taking apparatus 10 includes an MPU (Micro-Processing Unit) 11, a ROM 17, and operating switches 11a. The MPU 11 is a control part which performs the general control of the image taking apparatus 10 at the time of capturing, at the time of image playback, etc. according to a program.

The ROM 17 comprises a non-volatile and recordable memory, for example, flash memory (flash EEPROM), and is a recording medium where a control program 500 which performs the control processes of the image taking apparatus 10 is stored.

In the embodiment, when executed by the MPU 11, the control program 500 has functions of executing a plurality of corrections, such as an electronic camera-shake correcting process A, a tone correcting process B, a red-eye detecting process C, and a red-eye correcting process D, which will be described later.

The operating switches 11a notify the MPU 11 of an instruction from a camera user. Specifically, the operating switches 11a are switches which are set on or off according to the operation of a release button 21, a zoom button 22, a mode setting dial 23, an arrow pad switch 24, a MENU key switch 29, an OK button 30, etc. shown in the exterior rear view of FIG. 2 which will be described later.

The image taking apparatus 10 also includes an AF (Auto-Focus) control part 12c, a shutter control part 12e, an ND filter control part 12d, and a flash part 16.

The AF control part 12c controls the focus position of the lens part 12. The focus position control is executed as the image processing part 15 detects the contrast of image data output from the image pickup device 13, and sends a contrast signal to the MPU 11, which in turn outputs a control signal to the AF control part 12c according to the contrast signal. The MPU 11 sends the control signal to the AF control part 12c in such a way that the contrast signal of the image data becomes maximum.

As mentioned above, the shutter control part 12e controls the opening/closing of the shutter 12b. The shutter control part 12e performs exposure control to keep the amount of light input to the image pickup device 13 to a predetermined amount by performing such control as to close the shutter 12b in a short time under a bright environment and close the shutter 12b in a long time under a dark environment. At the time of exposure control, the shutter control part 12e may perform control with the ND filter 12a intervened between the lens part 12 and the image pickup device 13 in addition to switching the release time of the shutter 12b.

The flash part 16 is a fill light illuminating member which aids exposure. When the subject 90 is relatively or absolute dark, the flash part 16 which irradiates intensive light is used as a fill light. The flash part 16 is premised on a light source, such as white light LED or Xe discharge emission lamp, so that the amount of light can be controlled by the amount of current flowing.

While FIG. 1 shows the image processing part 15, the display control part 18a, the record/playback control part 19a, etc. separate from the MPU 11 for the sake of descriptive simplification, all the functions of the image processing part 15, the display control part 18a, and the record/playback control part 19a can be realized by the control program 500 which is executed by the MPU 11.

As exemplified in FIG. 2, the color panel display 20, and various operation buttons and keys corresponding to the operating switches 11a are arranged on the backside of the image taking apparatus 10 of the embodiment.

The color panel display 20 comprises a TFT color LCD panel or the like, and corresponds to the display part 18 in FIG. 1.

The release button 21 activates the shutter 12b via the shutter control part 12e.

The zoom button 22 adjusts the angle of view at the time of capturing.

The rotary mode setting dial 23 allows the user to select a still image shooting mode, a playback mode, a camera-shake reduced shooting mode, a move-image shooting mode and so forth in addition a "simple mode" which simplifies the operation contents of the image taking apparatus 10, a "normal model" in which the image taking apparatus can execute all the operations individually.

The cross type arrow pad switch 24 has triangle marks 24a provided at the respective end portions of the cross shape. Pressing the triangle marks 24a can enable settings for exposure correction, the flash, a self shooting mode, and a macro shooting mode. The arrow pad switch 24 is also used to move the cursor and change the menu levels at the time of displaying a menu setting screen.

An icon 25, an icon 26, an icon 27 and an icon 28 are provided at positions corresponding to the triangle marks 24a of the arrow pad switch 24.

The icon 25 indicates an exposure correction setting position. When the triangle mark 24a of the arrow pad switch 24 which points to the icon 25 is pressed, exposure correction becomes possible.

The icon 26 indicates a flash setting position. When the triangle mark 24a of the arrow pad switch 24 which points to the icon 26 is pressed, the flash firing mode can be changed.

The icon 27 indicates a self shooting mode setting position. When the triangle mark 24a of the arrow pad switch 24 which points to the icon 27 is pressed, the mode can be changed to the self shooting mode.

The icon 28 indicates a macro shooting mode setting position. When the triangle mark 24a of the arrow pad switch 24 which points to the icon 28 is pressed, the mode can be changed to the macro shooting mode setting position.

The MENU key switch 29, when pressed, displays the menu setting screen for a correction wizard 203 to be described later on the color panel display 20.

The OK button 30 is used as a SET key to set a menu item and a shift key to shift the mode to a function setting mode at the time of display the menu setting screen.

Figure 3:
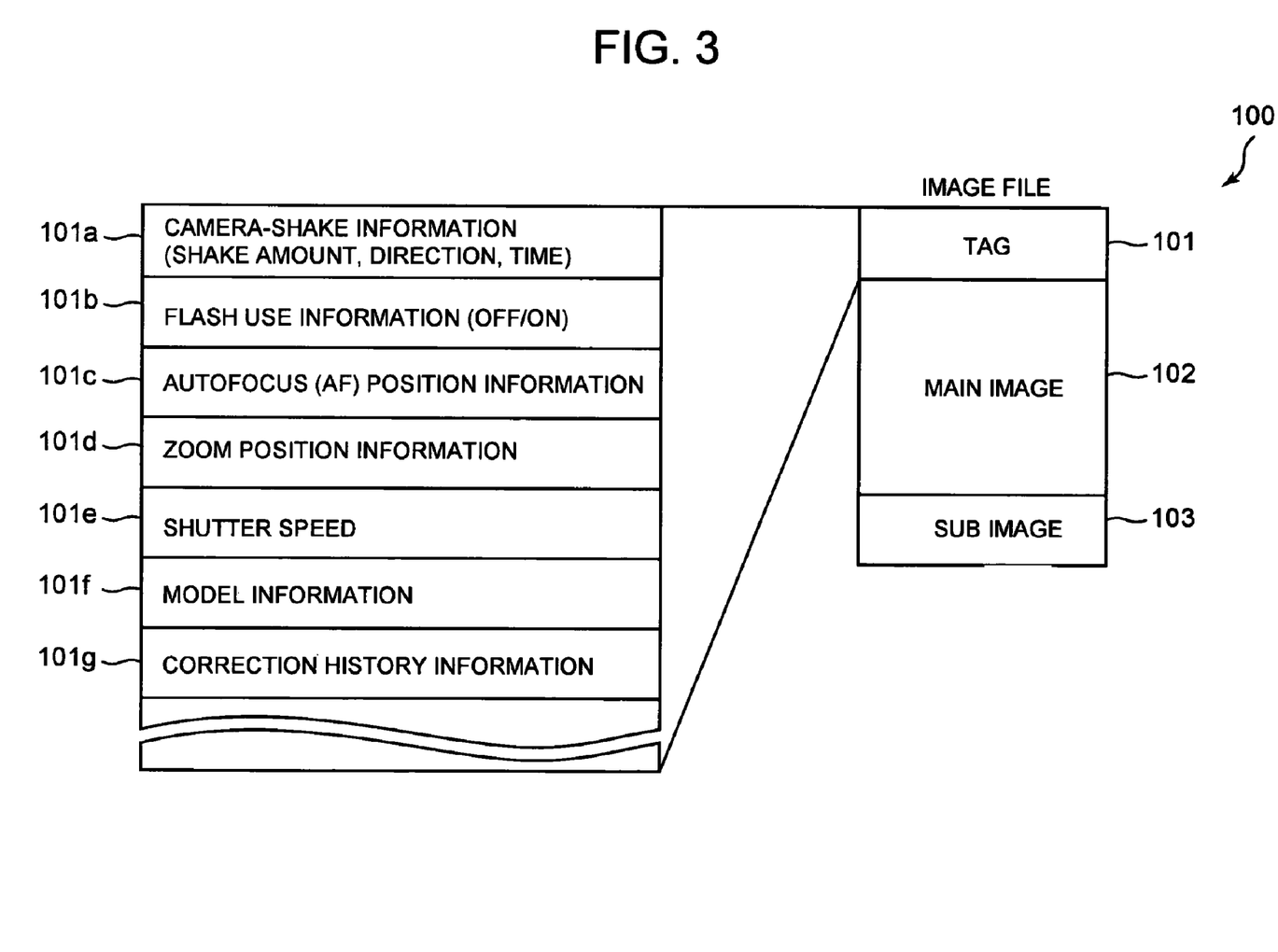
FIG. 3 is a conceptual diagram illustrating one structure of image data that is handled by the image taking apparatus according to the embodiment of the invention.

FIG. 3 is a conceptual diagram illustrating one structure of image data 100 that is handled by the image taking apparatus 10 according to the embodiment of the invention.

The image data 100 in the embodiment includes tag information 101, a main image 102 and a sub image 103.

The main image 102 indicates the body of image data captured by the image taking apparatus 10 or another image taking apparatus.

The tag information 101 is unique information to the main image 102, where information, such as a shooting condition, on the main image 102 is stored. In the embodiment, stored in the tag information is information, such as camera-shake information 101a, flash use information 101b, AF position information 101c, zoom position information 101d, shutter speed 101e, device model information 101f and correction history information 101g.

The camera-shake information 101a is information on the amount of shake, the shake direction, the time and the like of a camera shake detected at the time of capturing the main image 102.

The flash use information 101b is information indicating the use or no use of the flash part 16 at the time of capturing the main image 102.

The AF position information 101c is information indicating the AF position in the main image 102 at the time of capturing the main image 102.

The zoom position information 101d is information indicating the zoom position at the time of capturing the main image 102.

The shutter speed 101e is the shutter speed of the shutter 12b at the time of capturing the main image 102.

The device model information 101f is information indicating the model, or type, of the image taking apparatus 10 which has captured the main image 102. This information makes it possible to clarify that the main image 102 is the image captured by the image taking apparatus 10 of the embodiment.

The correction history information 101g holds the history of a sequence of correction processes (to be described later) on the main image 102.

In the embodiment, referring to the aforementioned various kinds of information in the tag information 101, the control program 500 automatically determines if each of the electronic camera-shake correcting process A, the tone correcting process B, the red-eye detecting process C, and the red-eye correcting process D should be executed or not, the amount of the corrections, etc. Then, the control program 500 controls the image processing part 15 to execute a correction process which is a combination of the electronic camera-shake correcting process A, the tone correcting process B, the red-eye detecting process C, and the red-eye correcting process D on the main image 102.

The sub image 103 is image data for displaying the main image 102 in the form of a thumbnail.

An example of the operation of the image taking apparatus 10 of the embodiment will be described below.

FIGS. 4, 5, 6A, 6B, 7, 8, and 9 are flowcharts illustrating one example of the operation of the image taking apparatus, 10 of the embodiment.

Figure 4:
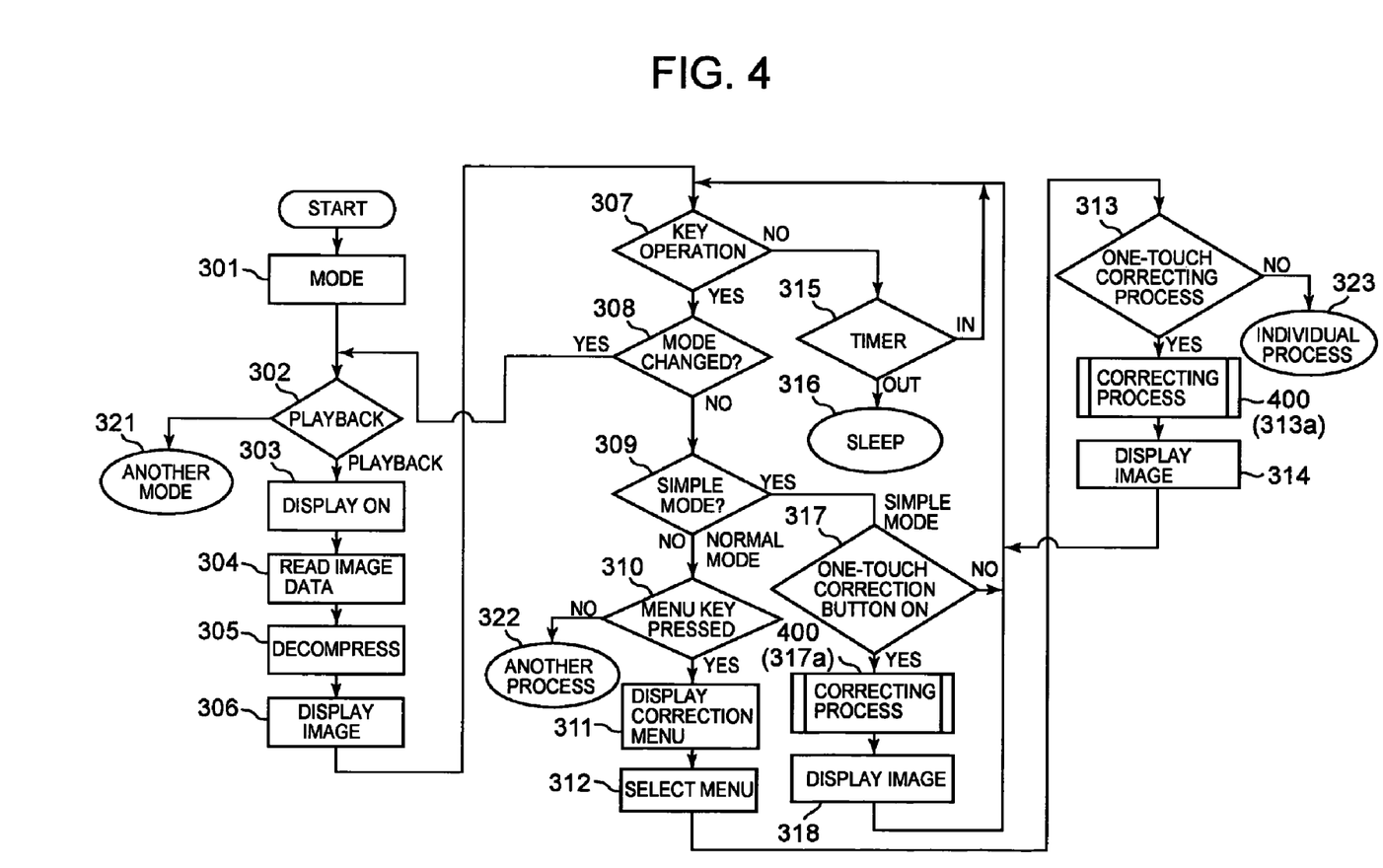
FIG. 4 is a flowchart illustrating one example of the operation of the image taking apparatus according to the embodiment of the invention.
Figure 5:
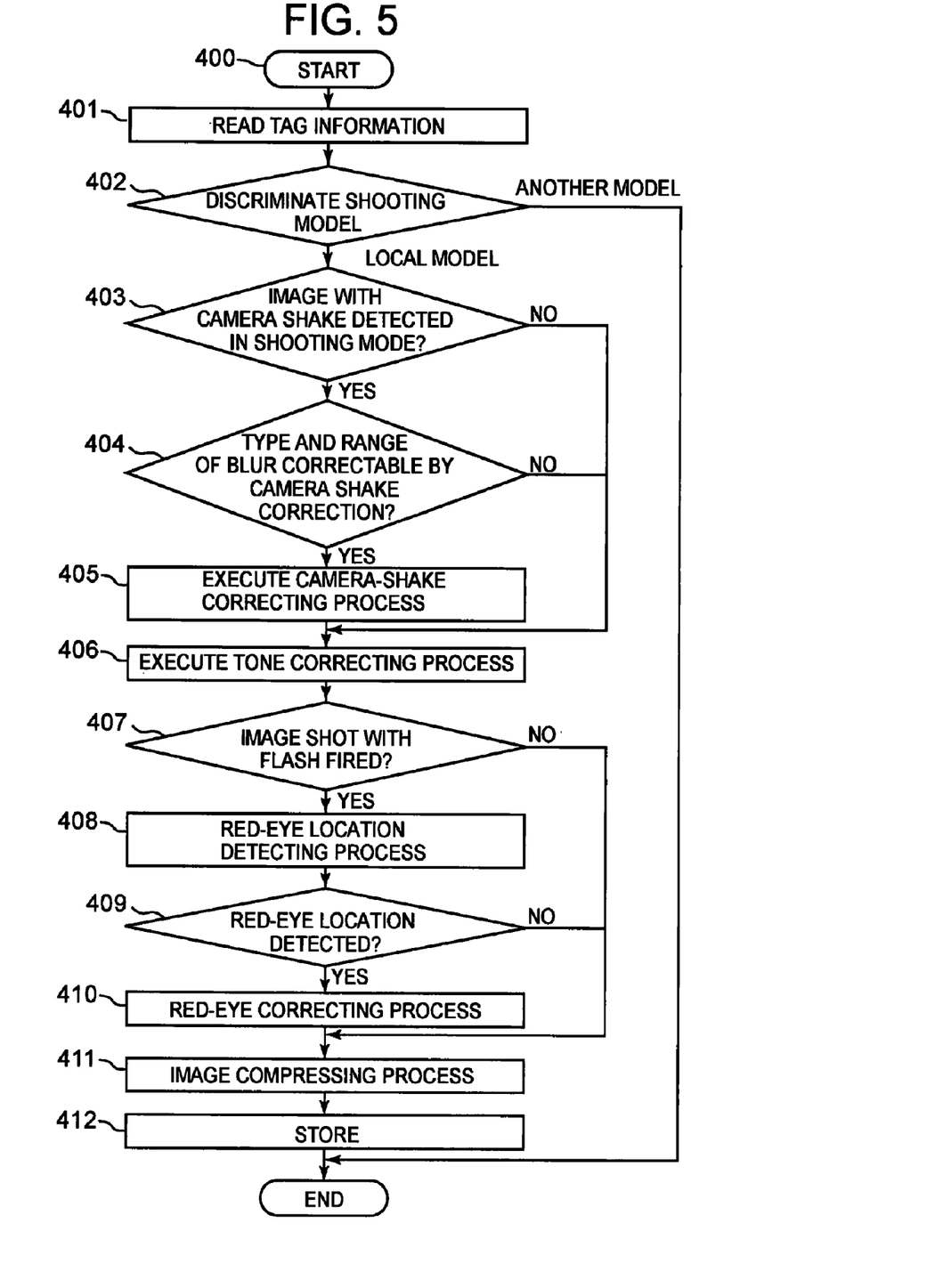
FIG. 5 is a flowchart illustrating another example of the operation of the image taking apparatus according to the embodiment of the invention.

First, when the image taking apparatus 10 is powered on, the control program 500 starts processes exemplified in the flowcharts in FIGS. 4 and 5.

When the user selects a mode by operating the mode setting dial 23 (step 301), the control program 500 determines whether the mode is the playback mode (step 302). In case of the playback mode, the control program 500 activates the color panel display 20 (step 303), reads image data 100 into a partial memory area of the ROM 17 via the record/playback control part 19a (step 304), and performs a decompression process on the main image 102 as needed (step 305). Then, the control program 500 displays the main image 102 on the color panel display 20 (step 306).

In this display state, the control program 500 stands by for an operational input from the user (step 307). When an operational input is detected, the control program 500 determines whether the playback mode has been changed to another mode (step 308). When the playback mode has not been changed, the control program 500 determines whether the current mode is the simple mode or normal mode (step 309).

When the simple mode is selected, the control program 500 displays a one-touch correction wizard 201 over the main image 102 displayed on the color panel display 20, and determines whether the OK button 30 has been depressed (step 317). When the OK button 30 has been depressed, the control program 500 executes the one-touch correcting process 400 exemplified in FIG. 5 to be described later (step 317a), and displays an image as a result of correction (all corrected image 102g to be described later) on the displayed on the color panel display 20 (Step 318), and returns to the step 307.

When it is determined in the step 309 that the mode is the normal playback mode, the control program 500 determines the user's operation of the MENU key switch 29 (step 310). When the correction menu is selected, the control program 500 displays the correction wizard 203 to be described later over the main image 102 displayed on the color panel display 20 (step 311), and detects a menu selection content in the correction wizard 203 (step 312).

Then, the control program 500 determines if the all corrections designation 203a has been selected in the correction wizard 203 (step 313). With the all corrections designation 203a selected, the control program 500 executes the one-touch correcting process 400 exemplified in FIG. 5 to be described later (step 313a), sends the corrected image (all corrected image 102g to be described later) to the color panel display 20 (step 314), and returns to the step 307.

When the control program 500 has determined in the step 313 that the electronic camera-shake correction 203b, the automatic brightness correction 203c or the red-eye correction 203d other than the all corrections designation 203a has been selected, the control program 500 proceeds to a process of executing the electronic camera-shake correcting process A, the tone correcting process B, or the red-eye detecting process C and the red-eye correcting process D, respectively corresponding to the electronic camera-shake correction 203b, the automatic brightness correction 203c or the red-eye correction 203d (step 323).

When the control program 500 has determined in the step 302 that a mode other than the playback mode has been selected, the control program 500 executes the mode selected (step 321). When an operational input is not detected in the step 307 even after a predetermined timer value is exceeded (step 315), the control program 500 proceeds to a sleep state to stop display on the color panel display 20 or set the processing system like the internal MPU 11 to a low power consumption state (step 316).

When the display of the correction wizard 203 is not selected in the step 310, the control program 500 executes another process (step 322).

Next, one example of the one-touch correcting process 400 will be explained referring to the flowchart in FIG. 5.

In the one-touch correcting process 400, the control program 500 reads the tag information 101 in the image data 100 developed on the ROM 17 (step 401), and determines based on the device model information 101f whether the image data 100 has been captured by the image taking apparatus 10 (step 402). When the image data 100 is data captured by another model, the control program 500 stops the process.

When the image data 100 has been captured by the image taking apparatus 10, on the other hand, the control program 500 determines based on the camera-shake information 101a in the tag information 101 whether the image data 100 is an image whose camera shake has been detected at the time of capturing (step 403). When camera shake is detected at the time of capturing, the control program 500 determines based on information, such as the auto-focus position information 101c, the zoom position information 101d and the shutter speed 101e, whether the type and range of the camera shake (or blur) is correctable by the camera shake correction (step 404). When it is determined in the step 404 that the camera shake is correctable, the control program 500 instructs the image processing part 15 to execute the electronic camera-shake correcting process A on the image data 100 (step 405).

When it is determined in the step 403 that camera shake has not been detected at the time of capturing, and it is determined in the step 404 that the camera shake is not correctable, the step 405 is not executed.

Further, the control program 500 instructs the image processing part 15 to execute the tone correcting process B to perform gradation (tone) correction on the image data 100 (step 406).

Next, the control program 500 determines if the flash has been used at the time of capturing by referring to the flash use information 101b in the tag information 101 (step 407). When the flash has been used, the control program 500 instructs the image processing part 15 to execute the red-eye detecting process C on the image data 100 (step 408).

Then, the control program 500 determines whether a red-eye noise 102c has been detected from the image data 100 (step 409). When the red-eye noise 102c is detected, the control program 500 instructs the image processing part 15 to execute the red-eye correcting process D (step 410).

When it is determined in the step 407 that the flash has not been used at the time of capturing the image data 100, the red-eye detecting process C and the red-eye correcting process D are not executed. When the red-eye noise 102c is not detected in the step 409, the red-eye correcting process D is not executed.

After sequentially performing one correction process or a plurality of correction processes needed on the image data 100 based on information in the tag information 101 in this manner, the control program 500 instructs the image processing part 15 to compress the image data 100 according to the standards of JPEG or the like (step 411). Then, the control program 500 stores the compressed image data 100 in the recording medium 19 via the record/playback control part 19a (step 412). At this time, the information in the tag information 101 before image correction is inherited directly, and information on the correction result of the electronic camera-shake correcting process A, the tone correcting process B, the red-eye detecting process C, or the red-eye correcting process D actually executed is stored in part of the tag information 101 as the correction history information 101g.

The transition of the screen of the color panel display 20 and the image data 100 in the one-touch correcting process 400 will be explained referring to FIGS. 6A, 6B, 7, 8 and 9. Note that the operations of displaying images or the like on the color panel display 20 in those diagrams are executed by the display control part 18a based on an instruction from the control program 500.

Figure 6A:
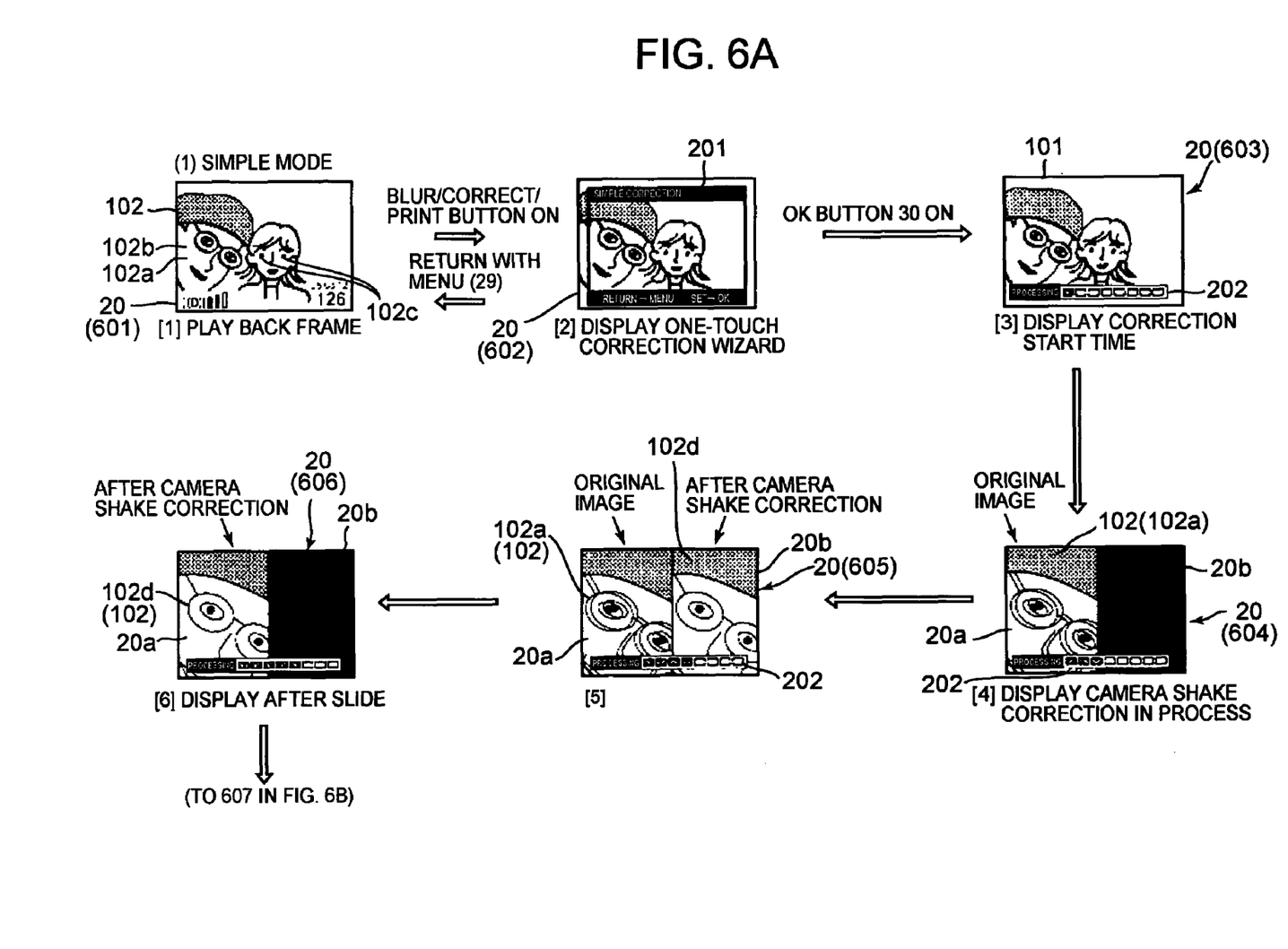
FIG. 6A is a display screen transitional view which, together with FIG. 6B, shows one example of the operation of the image taking apparatus according to the embodiment of the invention.
Figure 6B:
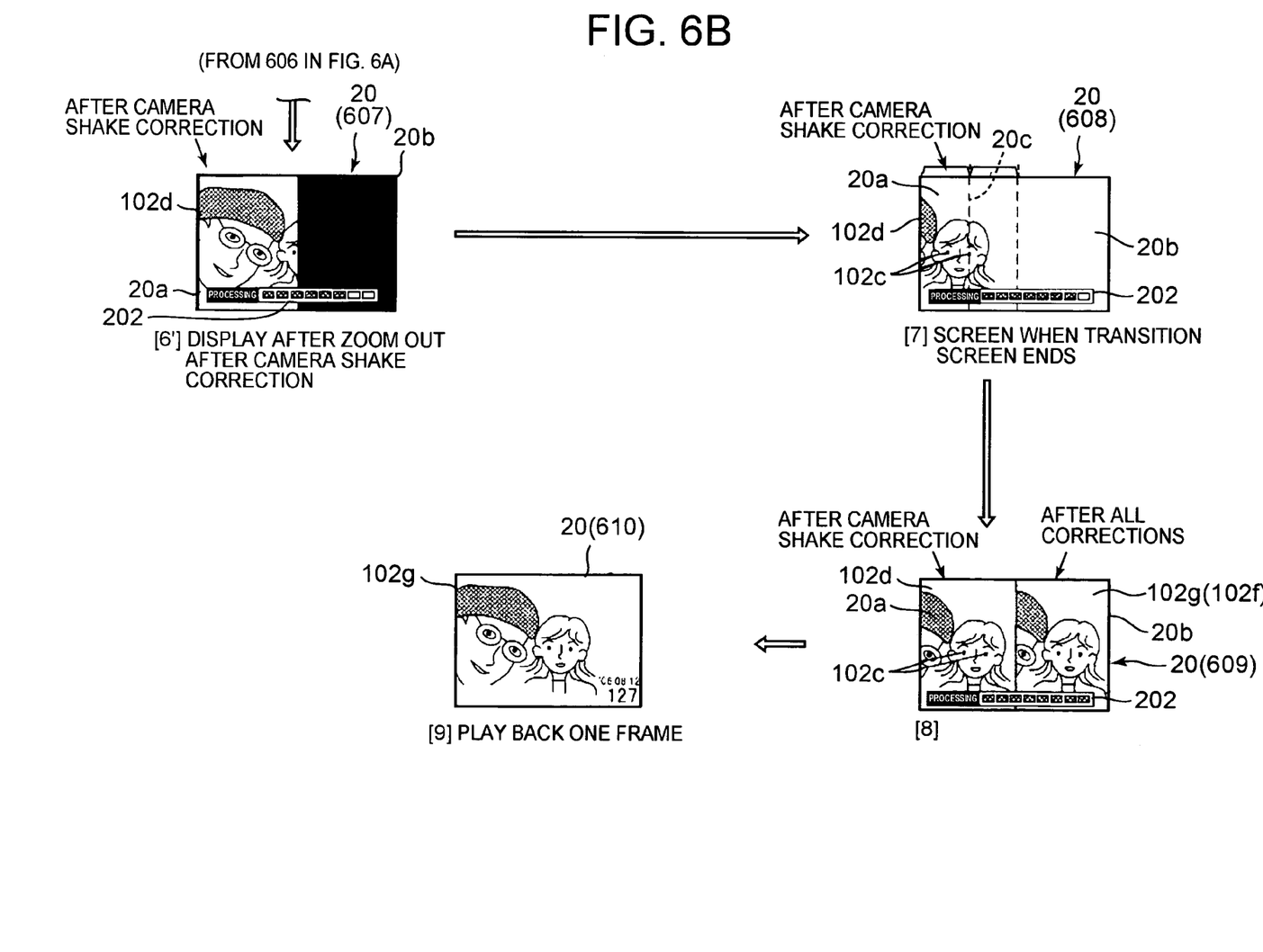
FIG. 6B is a display screen transitional view which, together with FIG. 6A, shows one example of the operation of the image taking apparatus according to the embodiment of the invention.

FIGS. 6A and 6B show one example of the one-touch correcting process 400 in the step 317a in the flowchart in FIG. 4.

In this case, it is shown that the main image 102 contains the camera-shake noise 102a, the tone noise 102b and the red-eye noise 102c.

In the present specification, the "tone noise 102b" includes a word "noise" for the sake of convenience, does not means that specific noise data is mixed in the main image 102 but indicates that the main image 102 is in a state where tone (brightness, gradation) needs to be corrected.

In the example of FIGS. 6A and 6B, the main image 102 (display in the step 306) first displayed on a display screen 601 of the color panel display 20 contains the camera-shake noise 102a, the tone noise 102b and the red-eye noise 102c.

When a key operation associated with correction is executed from the state of the display screen 601, the control program 500 displays the frame-like one-touch correction wizard 201 over the main image 102 as exemplified in a display screen 602.

When the depression of the OK button 30 in the display screen 602 is detected (the step 317), a progress indicator 202 is displayed over the main image 102 at a lower end portion of the screen as shown in a display screen 603, notifying the user of the initiation of correction.

In the embodiment, next, the control program 500 instructs the display control part 18a to separate the color panel display 20 to a left segment area 20a and a right segment area 20b. Then, the right segment area 20b or the right half is filled in black. Next, based on the AF position information 101c, the control program 500 zooms in the main image 102 toward the left segment area 20a or the left half while sliding the main image 102 toward the left segment area 20a in such a way that the autofocus portion of the main image 102 comes nearly the center of the left segment area 20a.

This state is shown as a display screen 604. Even during transition from the display screen 603 to the display screen 604, the progress indicator 202 is kept displayed, so that the user can observe the progress of the electronic camera-shake correcting process A.

Then, after the camera shake correction process ends, the control program 500 performs fade-in of the corrected image (camera-shake corrected image 102d) into the right segment area 20b as exemplified in a display screen 605.

Accordingly, the user can view the main image 102 containing the camera-shake noise 102a and the camera-shake corrected image 102d, respectively displayed on the left segment area 20a and the right segment area 20b of the color panel display 20, in comparison with each other, and can easily check the effect of the electronic camera-shake correcting process A.

During the display of the display screen 605, the tone correcting process B and the red-eye detecting process C are executed. The display time of the display screen 605 is the sum of the time from the start of tone correction to the end thereof and the time from the start of red-eye correction to the end thereof, or a given time (e.g., two seconds).

Next, the control program 500 slides both the main image 102 and the camera-shake corrected image 102d leftward as exemplified in a display screen 606. As a result, the right segment area 20b or the right half is filled in black and the camera-shake corrected image 102d is displayed on the left segment area 20a. Next, the control program 500 zooms out the camera-shake corrected image 102d to a one-frame display size in the left half screen as exemplified in a display screen 607 in FIG. 6B.

Next, as exemplified in a display screen 608, the control program 500 slides the camera-shake corrected image 102d in the left half (left segment area 20a) screen under the following conditions. It is to be noted that the zoom-out and the slide may be executed simultaneously.

When the red-eye noise 102c is detected in the red-eye detecting process C, the camera-shake corrected image 102d is displayed in such a way that the location of the red-eye noise 102c comes as closer to the center of the left segment area 20a in the right and left direction (the position of a center line 20c of the left segment area 20a) as possible. At this time, the red-eye correcting process D is executed in the background if possible.

When there are plural red-eye noises 102c, an arbitrary one is displayed at the position of the center line 20c. At this time, the image is set closer within a range where the image area does not become a half the screen of the left segment area 20a or less.

Otherwise, the left half or the right half of the camera-shake corrected image 102d, whichever has a larger change in the tone correcting process B, is displayed on the left segment area 20a.

When the red-eye correcting process D is executed at the time of displaying the display screen 608, the display screen 608 is displayed until the red-eye correcting process D is terminated.

As exemplified in a display screen 609, when the red-eye correcting process D is terminated during the display of the display screen 608, the all corrected image 102g (red-eye corrected image 102f) in which all of the camera-shake noise 102a, the tone noise 102b and the red-eye noise 102c are corrected is faded into the right segment area 20b.

The display screen 609 is displayed until writing of the all corrected image 102g into the recording medium 19 is completed (the steps 411 and 412 in FIG. 5), or for a predetermined time.

Thereafter, as exemplified in a display screen 610, the all corrected image 102g displayed on the right segment area 20b is faded into the entire screen of the color panel display 20.

The display speed of the progress indicator 202 during transition of the display screen 603 to the display screen 608 need not be constant, but can be adequately adjusted according to the time or the like required for each of the electronic camera-shake correcting process A, the tone correcting process B, the red-eye detecting process C, and the red-eye correcting process D.

Figure 7:
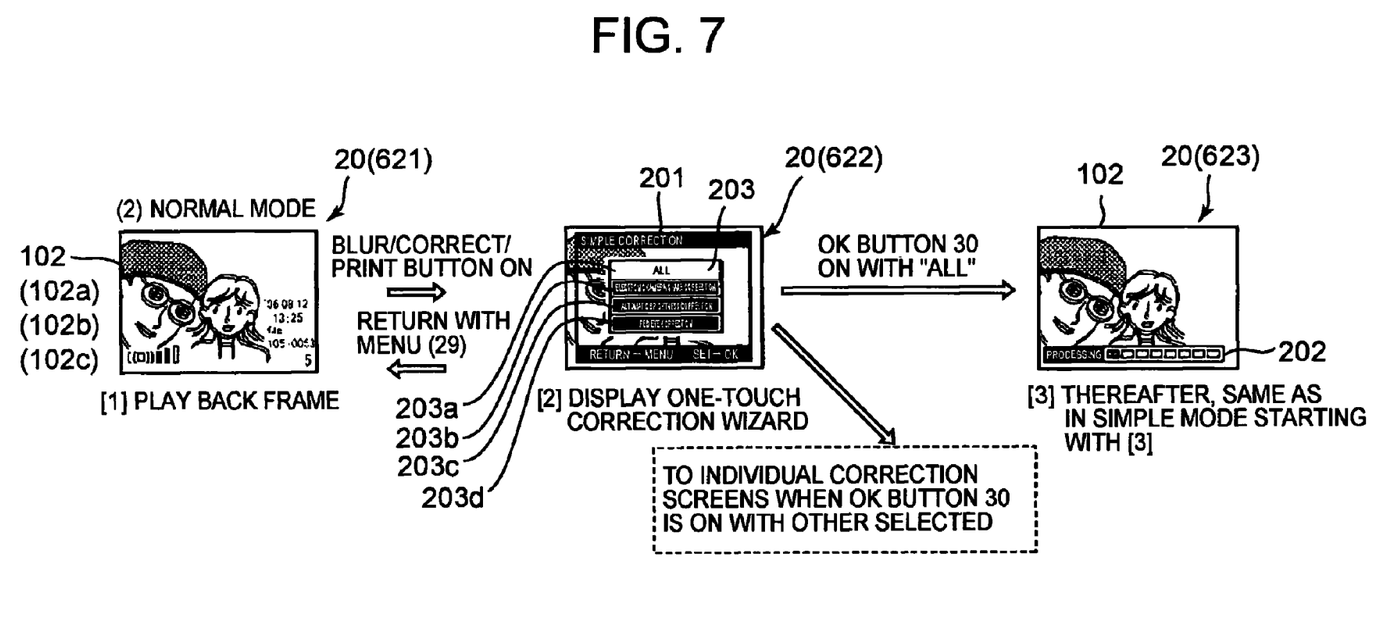
FIG. 7 is a display screen transitional view showing another example of the operation of the image taking apparatus according to the embodiment of the invention.

FIG. 7 shows one example of an image correcting process with the normal mode selected. That is, FIG. 7 shows a screen transition of the color panel display 20 in the correction process recited in steps 306 to 323 in FIG. 4.

Specifically, a display screen 621 shows the main image 102 displayed on the color panel display 20 in step 306 and containing the electronic camera-shake correcting process A, the tone correcting process B, the red-eye detecting process C, and the red-eye correcting process D.

A display screen 622 shows a state where the normal mode is selected in the step 309 and the correction wizard 203 is displayed in the step 311.

In the state of the display screen 622, one of the all corrections designation 203a to the red-eye correction 203d is selected as a candidate by pressing the adequate one of the up and down triangle marks 24a of the arrow pad switch 24, and execution of the selected candidate is set by pressing the OK button 30.

That is, when the OK button 30 is pressed with the all corrections designation 203a selected in the correction wizard 203, the display screen is shifted to a display screen 623 (same as the display screen 601), so that continuous execution of the electronic camera-shake correcting process A to the red-eye correcting process D is started with the continuous display of the display screens 601 to 610.

When one of the electronic camera-shake correction 203b to the red-eye correction 203d excluding the all corrections designation 203a is selected, however, one of the electronic camera-shake correcting process A, the tone correcting process B, the red-eye detecting process C, and the red-eye correcting process D is executed.

Figure 8:
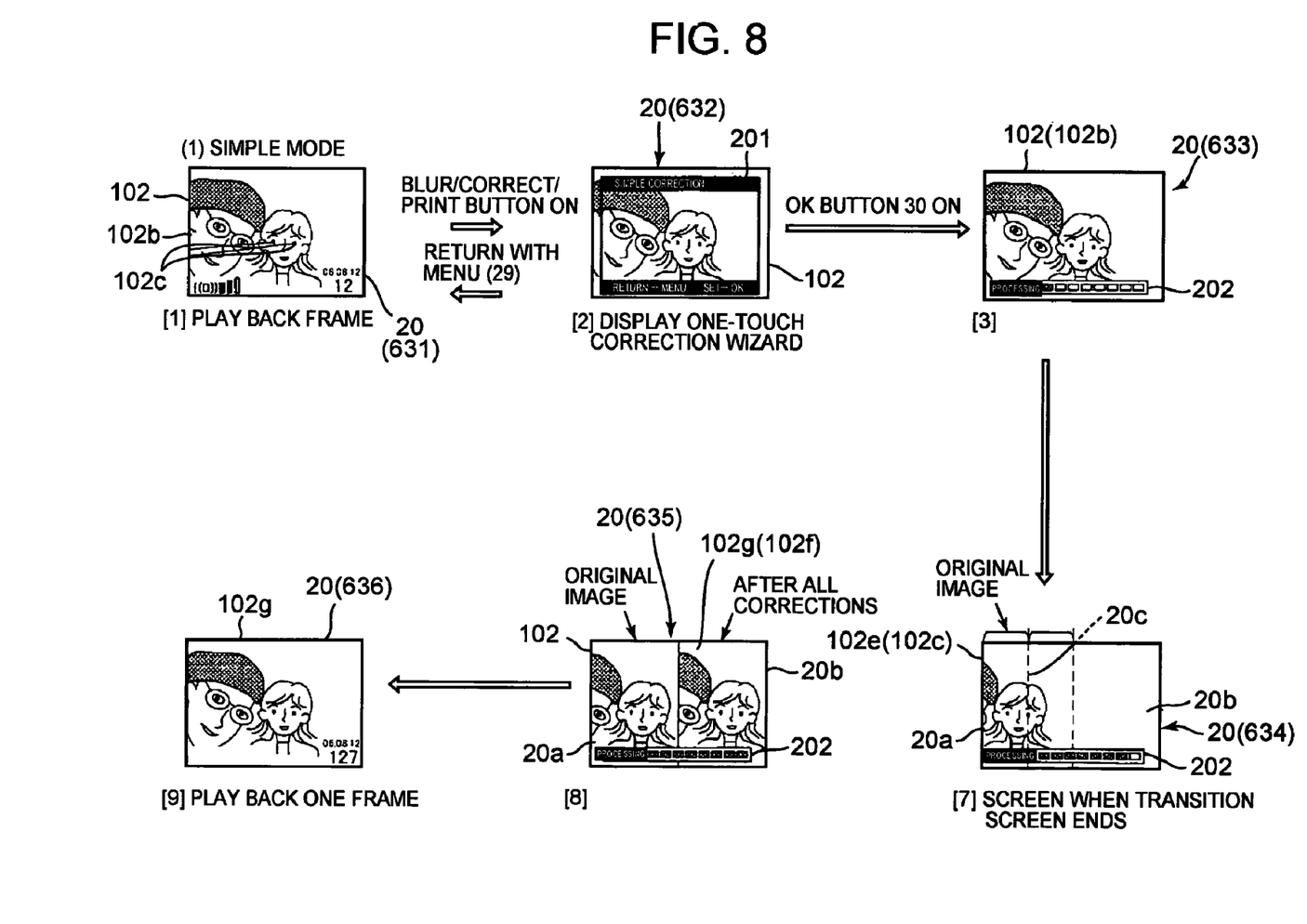
FIG. 8 is a display screen transitional view showing a further example of the operation of the image taking apparatus according to the embodiment of the invention.

FIG. 8 shows a transitional example of the display state on the color panel display 20 when the electronic camera-shake correcting process A is not executed in the one-touch correcting process 400 exemplified in FIGS. 6A and 6B, and the other correcting processes, namely the tone correcting process B, the red-eye detecting process C and the red-eye correcting process D are executed.

This is a case where the electronic camera-shake correcting process A in the step 405 is skipped in the one-touch correcting process 400 which is executed in the step 317a in FIG. 4.

In this case, a display screen 631 shows the main image 102 which is displayed on the color panel display 20 in the step 306, and contains the tone noise 102b and the red-eye noise 102c, not the camera-shake noise 102a.

When a key operation associated with correction is executed from the state of the display screen 631, the control program 500 displays the frame-like one-touch correction wizard 201 over the main image 102 as exemplified in a display screen 632.

When the depression of the OK button 30 in the display screen 632 is detected (the step 317), the progress indicator 202 is displayed over the main image 102 at a lower end portion of the screen as shown in a display screen 633, notifying the user of the initiation of correction.

In the example of FIG. 8, the tone correcting process B and the red-eye detecting process C are executed while displaying the display screen 633, and the display screen 633 is kept displayed during execution of those processes.

Then, as exemplified in a display screen 634, the control program 500 controls the display control part 18a in such a way as to separate the color panel display 20 to the left segment area 20a and the right segment area 20b, and slide the main image 102 to the left segment area 20a or the left half.

When the red-eye noise 102c is detected in the transition from the display screen 633 to the display screen 634, the image is displayed in such a way that the location of the red-eye noise 102c comes as closer to the center of the left segment area 20a in the right and left direction (the center line 20c) as possible, and the red-eye correcting process D is executed in the background.

When there are plural red-eye noises 102c, an arbitrary one is set as closer to the center line 20c as possible within a condition that the area of a tone-corrected image 102e does not become a half the screen of the screen (left segment area 20a) or less.

Otherwise, the left half or the right half of the tone-corrected image 102e, whichever has a larger change in the tone correcting process B, is selected and displayed on the left segment area 20a in the display screen 634.

When the red-eye correcting process D is executed at the time of displaying the display screen 634, the display screen 634 is displayed until the red-eye correcting process D is terminated.

As exemplified in a display screen 635, after the red-eye correcting process D is terminated, the all corrected image 102g (red-eye corrected image 102f) in which all of the tone noise 102b and the red-eye noise 102c are corrected is faded into the right segment area 20b.

The display state of the display screen 635 is maintained only for the time for compressing an image (step 411) and of writing the image in the recording medium 19 (step 412) in the flowchart in FIG. 5 or only for a predetermined time.

Thereafter, as exemplified in a display screen 636, the all corrected image 102g in which the tone noise 102b and the red-eye noise 102c are corrected is displayed on the entire screen of the color panel display 20.

Figure 9:
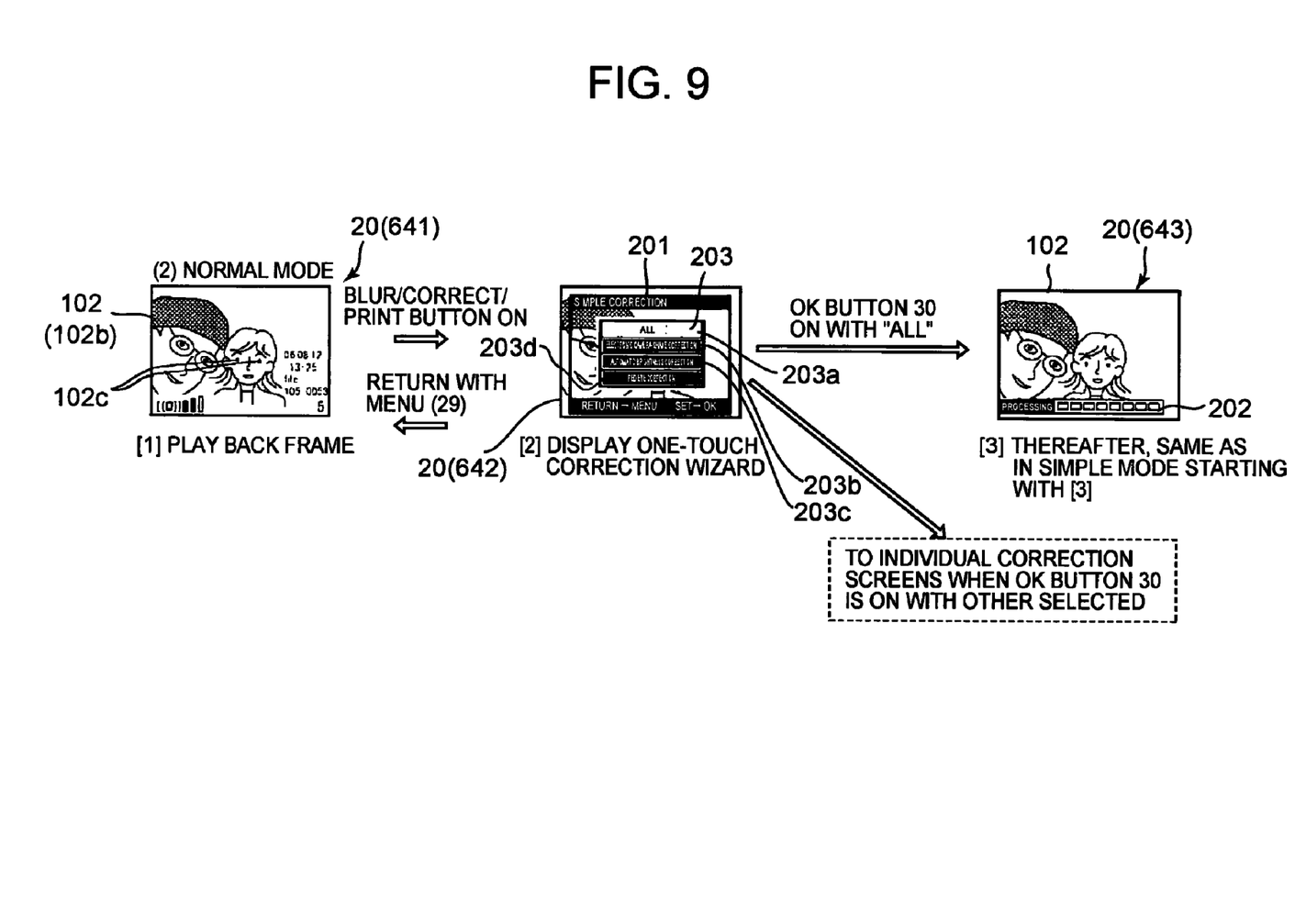
FIG. 9 is a display screen transitional view showing a still further example of the operation of the image taking apparatus according to the embodiment of the invention.

FIG. 9 shows an example of screen transition on the color panel display 20 in an image correcting process with the normal mode selected.

The transition is basically the same as that in FIG. 7, except that the main image 102 does not contain the camera-shake noise 102a, i.e., the electronic camera-shake correcting process A is not executed.

That is, a display screen 641 shows a state where the main image 102 which contains the tone noise 102b and red-eye noise 102c, not camera-shake noise 102a, is displayed on the entire screen of the color panel display 20.

A next display screen 642 shows a state where the correction wizard 203 is displayed over the main image 102, and one of the all corrections designation 203a to the red-eye correction 203d is selected by an up/down operation of the arrow pad switch 24 and the correction process of the selected item is started by depression of the OK button 30.

When the all corrections designation 203a is selected and executed, the display screen is shifted to a display screen 643 which corresponds to the display screen 631 or the initial screen in FIG. 8.

When one of the electronic camera-shake correction 203b to the red-eye correction 203d excluding the all corrections designation 203a is selected, the screen is shifted to a process screen for each image correcting process (not shown).

Figure 10:
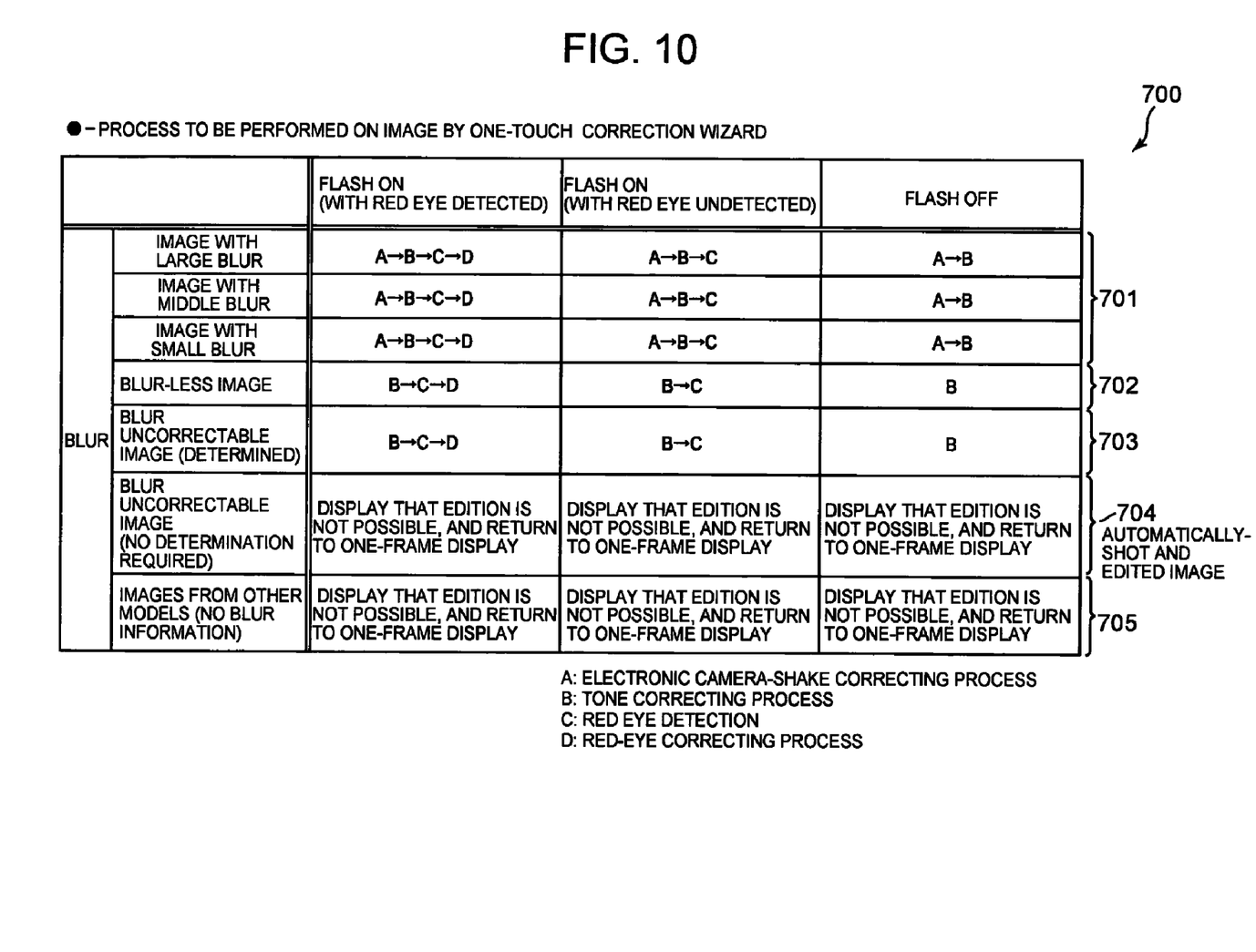
FIG. 10 is a conceptual diagram illustrating a combination example of a plurality of image correcting processes which are executed by the image taking apparatus according to the embodiment of the invention.

FIG. 10 is a conceptual diagram illustrating a combination example of a plurality of image correcting processes, such as the electronic camera-shake correcting process A to the red-eye correcting process D, which are automatically combined and executed by the control program 500 according to the amount of camera shake and whether the flash has been used or not at the time of capturing.

A correction process combination table 700 exemplified in FIG. 10 shows correction process combination examples 701 to 705 in the case of combining the degrees of camera shake or the conditions of the presence/absence of camera shake exemplified vertically and the conditions of the use/non-use of the flash exemplified horizontally.

The conditions used in the correction process combination table 700 can be determined by the control program 500 referring to the tag information 101 accompanying the image data 100.

The correction process combination 701 in the correction process combination table 700 shows a case where the combination of the electronic camera-shake correcting process A to the red-eye correcting process D is determined according to the degree of camera shake.

The correction process combination 702 shows a case where no camera shake is not detected, and the combination does not include the electronic camera-shake correcting process A.

The correction process combination 703 shows a case where, for example, the shutter speed is too slow to have an excessive amount of camera shake, so that the electronic camera-shake correcting process A is excluded.

The correction process combination 704 shows a case where the electronic camera-shake correcting process A to the red-eye correcting process D have been executed by the image taking apparatus 10, so that non of the correcting processes is executed.

The correction process combination 705 shows a case where the image data 100 is data captured by another device model different from the image taking apparatus 10, so that non of the correcting processes is executed. Whether the image data 100 is data captured by another device model can be known based on the device model information 101f.

The correction process combination table 700 is implemented as a part of the control program 500 as needed, and is used to control the one-touch correcting process 400.

According to the image taking apparatus 10 of the embodiment, as described above, the control program 500 continuously executes an adequate combination of image correcting processes, such as the electronic camera-shake correcting process A, the tone correcting process B, the red-eye detecting process C, and the red-eye correcting process D by referring to the tag information 101 accompanying the image data 100.

As a result, a plurality of correction processes can be performed on the image data 100 adequately with a simple operation and quicker as compared with the case where a plurality of correction processes are designated and executed individually. Further, the embodiment does not require involvement of the user, and can adequately select a correction process to be performed on the image data 100.

The image taking apparatus 10 of the embodiment performs data compression and saving process on the image data 100 only once after the electronic camera-shake correcting process A, the tone correcting process B, the red-eye detecting process C, and the red-eye correcting process D are collectively executed, after decompression of the image data 100. This reduces the amount of image information to be lost according to data compression, and thus can prevent degrading of images. That is, a plurality of correction processes can be performed on the image data 100 without degrading the image data 100, thereby improving the quality of the image data 100.

As the color panel display 20 is separated into a plurality of segment areas, the left segment area 20a and the right segment area 20b, and images before and after the image correction process are output to the left segment area 20a and the right segment area 20b side by side, a user can easily observe a change in the images before and after the image correction process.

Further, when a plurality of image correcting processes are performed continuously, sliding the images before and after the image correction process from the right segment area 20b to the left segment area 20a allows the user to observe the effects of the correcting processes more easily.

Furthermore, as the AF position and the position of the red-eye noise 102c are zoomed into the image to be displayed on the left segment area 20a and the right segment area 20b in such a way that those positions come closer to the centers of the segment areas (center line 20c). This makes it easier for the user to observe a change in the images before and after the image correction process.

Accordingly, the effects of a plurality of correcting processes on the image data 100 can be presented to the user more easily.

In the embodiment, as the sub image 103 captures a subject, it can be called "imaging part". As the recording medium 19 stores image data output from the imaging part and/or image data externally input, it can be called "image recording part". Because the color panel display 20 displays the image data, it can be called "image display part". As the image processing part 15 can perform plural types of correction processes on the image data read from the image recording part, it can be called "image correction processing part". Because the MPU 11 determines the combination and order of the plural types of correction processes based on information indicating correction and continuously performs the plural types of correction processes on the image data, it can be called "correction control part". Because the display control part 18a separates the display screen of the image display part into a plurality of display areas and displays the image data before and after the image correction process on the respective display areas, it can be called "display control part". As the operating switches 11a can select different playback modes for the image data 100, they can be called "mode selecting part".

While there has been shown and described what are considered to be preferred embodiments of the invention, it will, of course, be understood that various modifications and changes in form or detail could readily be made without departing from the spirit of the invention. It is therefore intended that the invention not be limited to the exact forms described and illustrated, but constructed to cover all modifications that may fall within the scope of the appended claims.

What is claimed is:

1. An image taking apparatus comprising:
   an imaging part that images a subject;
   an image recording part that records at least one of image data output from the imaging part and image data input externally;
   an image display part that displays the image data;
   an image correction processing part capable of performing plural types of correction processes on the image data read from the image recording part; and
   a correction control part that determines a combination and an order of respective ones of the plural types of correction processes to be performed based on information instructing correction, and that continuously executes the determined correction processes on the image data;
   wherein the image data includes tag information including shooting information, and the shooting information includes camera-shake information and flash use information; and
   wherein the correction control part determines the combination and the order of the correction processes to be performed in accordance with the shooting information.

2. The image taking apparatus according to claim 1, wherein the correction control part continuously executes the determined correction processes on the image data in response to an operation instruction given as the information instructing correction,
   wherein the image correction processing part has functions of executing camera shake correction, tone correction, and red-eye correction, and
   wherein the correction control part determines the combination and the order of the of correction processes to be performed such that the camera shake correction is executed prior to the tone correction, and the red-eye correction is executed after the tone correction.

3. The image taking apparatus according to claim 2, wherein the correction control part controls the image recording part to compress and record the image data after completion of a last one of the correction processes.

4. The image taking apparatus according to claim 3, wherein the image recording part maintains the shooting information in the tag information of the image data, and also stores and records a history of execution of the correction processes in the tag information.

5. The image taking apparatus according to claim 2, further comprising a display control part that segments a display screen of the image display part into a plurality of display areas, and displays the image data before and after the correction processes on respective ones of the display areas of the display screen.

6. The image taking apparatus according to claim 5, wherein the display control part:
   segments the display screen into first and second display areas,
   in one of the correction processes, outputs the image data before the correction process to the first display area and outputs the image data after the correction process to the second display area, and
   before initiation of a next one of the correction processes, slides the image data on the second display area to the first display area.

7. The image taking apparatus according to claim 5, wherein the display control part:
   segments the display screen into first and second display areas,
   enlarges or selects correction target areas in the image data before and after the correction process, and
   respectively displays the correction target areas on the first and second display areas.

8. The image taking apparatus according to claim 5, wherein the display control part:
   segments the display screen into first and second display areas, and in one of the correction processes, upon outputting the image data before the correction process to the first display area and outputting the image data after the correction process to the second display area, suppresses display of the image data on the second display area before initiation of or during at least one of the correction processes.

9. The image taking apparatus according to claim 5, wherein the display control part suppresses outputting of information other than the image data to the display screen during at least one of the correction processes.

10. The image taking apparatus according to claim 1, further comprising a mode selecting part that selects different playback modes for the image data, wherein the correction control part switches between continuous execution of the correction processes on the image data and selective execution of one of the correction processes by the image correction processing part, based on the playback mode selected by the mode selecting part.

11. The image taking apparatus according to claim 1, further comprising:
a determining part that determines whether the image data has been captured by the image taking apparatus, and controls the correction control part to one of (i) continuously execute the image correction processes on the image data when it is determined that the image data has been captured by the image taking apparatus, and (ii) stop the image correction processes on the image data when it is determined that the image data has not been captured by the image taking apparatus.

* * * * *